(12) United States Patent
Ijima et al.

(10) Patent No.: US 10,946,901 B2
(45) Date of Patent: Mar. 16, 2021

(54) REAR OPENING STRUCTURE OF VEHICLE AND METHOD FOR MANUFACTURING REAR OPENING STRUCTURE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Mai Ijima, Kariya (JP); Yu Katou, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 16/354,503

(22) Filed: Mar. 15, 2019

(65) Prior Publication Data

US 2019/0300066 A1    Oct. 3, 2019

(30) Foreign Application Priority Data

Mar. 28, 2018   (JP) .............................. JP2018-063329

(51) Int. Cl.
*B62D 25/08*      (2006.01)
*B62D 25/06*      (2006.01)
*B62D 25/04*      (2006.01)

(52) U.S. Cl.
CPC ........... *B62D 25/088* (2013.01); *B62D 25/06* (2013.01); *B62D 25/087* (2013.01); *B62D 25/04* (2013.01)

(58) Field of Classification Search
CPC .... B62D 25/088; B62D 25/06; B62D 25/087; B62D 25/04
USPC ....................................... 296/193.06
See application file for complete search history.

(56) References Cited

U.S. PATENT DOCUMENTS

2016/0347141 A1\* 12/2016  Fukutomi ............ B62D 25/088

FOREIGN PATENT DOCUMENTS

| JP | 2012228948 A | * 11/2012 | ............. B62D 25/06 |
|---|---|---|---|
| JP | 2012228948 A | 11/2012 | |
| JP | 2015-147456 A | 8/2015 | |
| JP | 6217429 B2 | 10/2017 | |

\* cited by examiner

*Primary Examiner* — Joseph D. Pape
*Assistant Examiner* — Dana D Ivey
(74) *Attorney, Agent, or Firm* — Sughrue Mion, PLLC

(57) ABSTRACT

In a rear opening structure of a vehicle, a roof panel and a trough are arranged on an upper end of an opening for coupling a back door. Each of left and right ends of a vertical wall of the roof panel in the width direction includes a welding point where the roof panel and the trough are welded to each other. Beads that extend in the vertical direction are provided such that each of the beads is arranged in a vicinity of one of the welding points of the left and right ends of the vertical wall and on an inner side of the one of the welding points of the left and right ends. An end of each bead in the vertical direction is connected to at least one of a rear end surface and a horizontal wall of the roof panel.

5 Claims, 5 Drawing Sheets

REAR OPENING STRUCTURE OF VEHICLE AND METHOD FOR MANUFACTURING REAR OPENING STRUCTURE

BACKGROUND

The present disclosure relates to a rear opening structure of a vehicle and a method for manufacturing the rear opening structure.

A rear opening structure of a vehicle at the rear part of the vehicle body is formed by welding metal plates at welding points. Japanese Laid-Open Patent Publication No. 2015-147456 describes an opening structure of the rear part of a vehicle body for ensuring a high rigidity while reducing the weight with a small number of reinforcements to counter twisting that occurs in the vehicle body.

In a vehicle, shock absorbers are arranged between the vehicle body and the wheels to prevent the vehicle body from receiving an excessive force from a road surface when the vehicle is travelling on the road. The characteristics of the shock absorbers are adjusted in accordance with the ride quality of the vehicle. When the vehicle is travelling on rough roads, the vehicle body may receive an excessive force from the shock absorbers. This may deform the rear opening structure of the vehicle, causing stress to be excessively concentrated on the welding points of the rear opening structure. When excessive stress is repeatedly applied to the welding points of the rear opening structure, cracks may occur in the vicinity of the welding points of the rear opening structure.

SUMMARY

It is an object of the present disclosure to provide a rear opening structure of a vehicle that prevents the generation of high stress at welding points of the upper corner of the rear opening of the vehicle simply by changing the components even if a large upward thrust acts on the rear part of the vehicle from the shock absorbers and a method for manufacturing the rear opening structure.

Examples of the present disclosure will now be described.

Example 1: A rear opening structure of a vehicle is provided. The rear opening structure includes a roof panel and a trough. A rear part of the vehicle includes an opening for coupling a back door. The roof panel and the trough are arranged on an upper end of the opening at the rear part of the vehicle. The roof panel includes a rear end surface forming an upper surface of the vehicle, a horizontal wall extending in a width direction of the vehicle along the opening for coupling the back door and having a fixed width in a front-to-rear direction of the vehicle, and a vertical wall extending in a vertical direction of the vehicle to connect the rear end surface and the horizontal wall to each other. Each of left and right ends of the vertical wall in the width direction includes a welding point where the roof panel and the trough are welded to each other. Beads extending in the vertical direction are formed in a vicinity of each of the welding points of the left and right ends of the vertical wall and on an inner side of the welding points of the left and right ends in the width direction. Each of the beads is formed such that an end of each bead in the vertical direction is connected to at least one of the rear end surface and the horizontal wall.

With this structure, the generation of high stress at the welding points of the upper corner of the rear opening of the vehicle is simply prevented by changing the components even if a large upward thrust acts on the rear part of the vehicle from the shock absorbers.

Example 2: In the rear opening structure according to example 1, each bead may extend in the vertical direction on the vertical wall, and each bead may be arranged such that an upper end of the bead is connected to the rear end surface and a lower end of the bead is connected to a side of the horizontal wall. With this case, when a large upward thrust acts on the rear part of the vehicle from the shock absorbers, the outward curving of the vertical wall is further limited.

Example 3: In the rear opening structure according to example 1 or 2, each bead may extend in the vertical direction on the vertical wall, a lower end of each bead may be connected to a side of the horizontal wall, and each bead may be arranged such that the lower end of the bead has a larger width than an upper end of the bead.

With this structure, the generation of high stress in the welding point of the upper corner of the rear opening structure of the vehicle is effectively prevented.

Example 4: In the rear opening structure according to any one of examples 1 to 3, the vertical wall may include a step structure extending in the width direction between the bead arranged in the vicinity of the welding point at the left end and the bead arranged in the vicinity of the welding point at the right end. With this structure, as compared to when, for example, the beads are arranged only on the left and right sides of the rear opening in the width direction, the concentration of stress in the welding point 21 is further limited.

Example 5: A roof panel of a vehicle is provided. A rear part of the vehicle includes an opening for coupling a back door. The roof panel and a trough are arranged on an upper end of the opening at the rear part of the vehicle. The roof panel includes a rear end surface forming an upper surface of the vehicle, a horizontal wall extending in a width direction of the vehicle along the opening for coupling the back door and having a fixed width in a front-to-rear direction of the vehicle, and a vertical wall extending in a vertical direction of the vehicle to connect the rear end surface and the horizontal wall to each other. Each of left and right ends of the vertical wall in the width direction includes a welding point where the roof panel and the trough are welded to each other. Beads extending in the vertical direction are formed in a vicinity of each of the welding points of the left and right ends of the vertical wall and on an inner side of the welding points of the left and right ends in the width direction. Each of the beads is formed such that an end of each bead in the vertical direction is connected to at least one of the rear end surface and the horizontal wall.

Example 6: A method for manufacturing a rear opening structure of a vehicle is provided. The method includes forming an opening for coupling a back door at a rear part of a vehicle, preparing a roof panel that includes a rear end surface, a horizontal wall, and a vertical wall, arranging the roof panel and a trough on an upper end of the opening at the rear part of the vehicle, and welding the roof panel and the trough to each other. The arranging the roof panel and the trough includes forming, with the rear end surface, an upper surface of the vehicle, extending the horizontal wall in a width direction of the vehicle along the opening for coupling the back door such that the horizontal wall has a fixed width in a front-to-rear direction of the vehicle, and extending the vertical wall in a vertical direction of the vehicle to connect the rear end surface and the horizontal wall to each other. The welding the roof panel and the trough to each other includes welding the roof panel and the trough to each other at a welding point arranged on each of left and right ends of the vertical wall in the width direction. The preparing the roof panel includes forming beads that extend in the vertical direction in a vicinity of one of the welding points of the left and right ends of the vertical wall and on an inner side of the one of the welding points in the width direction. The forming the beads includes connecting an end of each of the beads in the vertical direction to at least one of the rear end surface and the horizontal wall.

In the present disclosure, the generation of high stress at welding points of the upper corner of the rear opening of the vehicle is prevented even if a large upward thrust acts on the rear part of the vehicle from the shock absorbers.

Other aspects and advantages of the present disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferable embodiments together with the accompanying drawings in which.

DETAILED DESCRIPTION

Figure 3A:
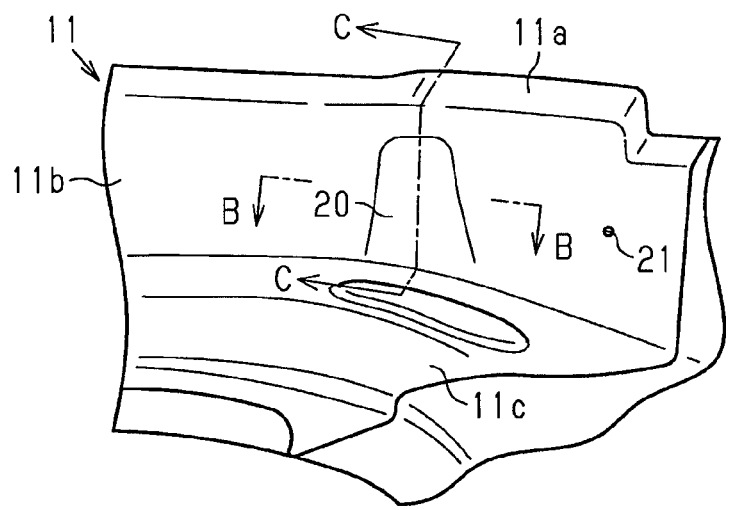
FIG. 3A is a schematic view showing a bead arranged on the roof panel at the upper part in the rear opening structure of the vehicle shown in FIG. 1A.
Figure 3B:
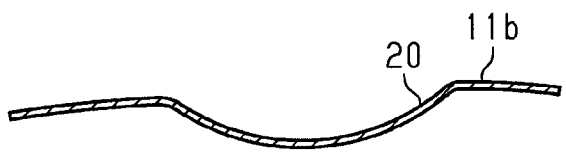
FIG. 3B is a schematic cross-sectional view taken along line B-B in FIG. 3A.
Figure 4:
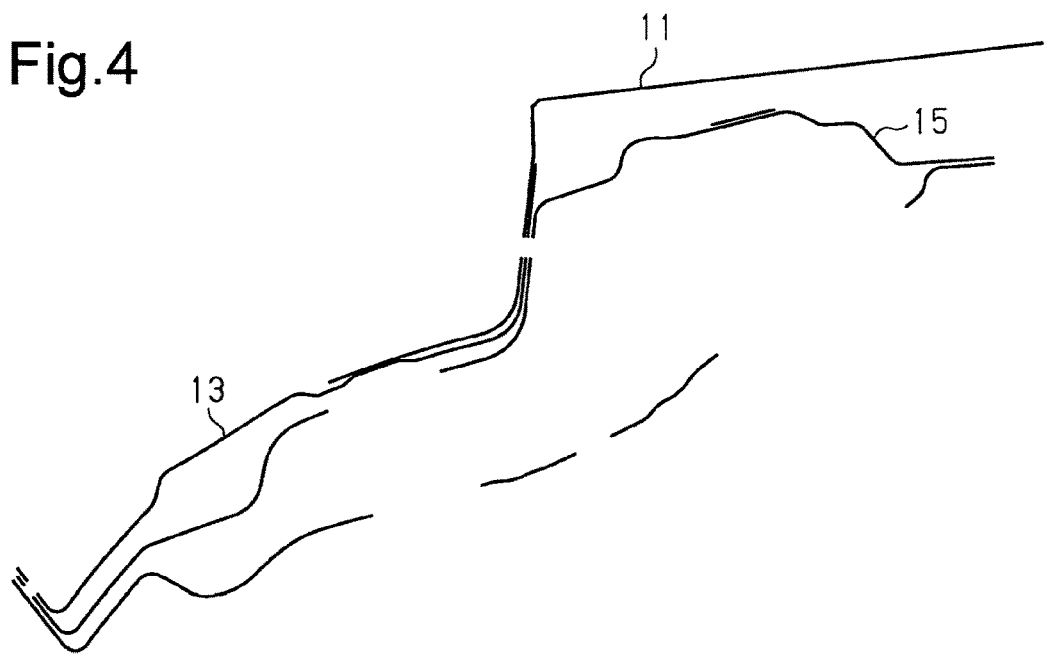
FIG. 4 is a schematic cross-sectional view taken along line A-A in FIG. 1.
Figure 5A:
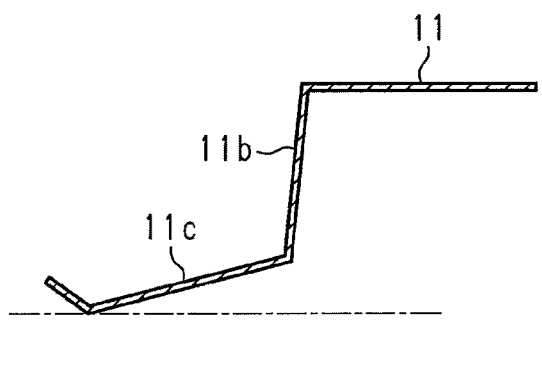
FIG. 5A is a schematic cross-sectional view showing the roof panel prior to deformation without beads in a comparative example.
Figure 5B:
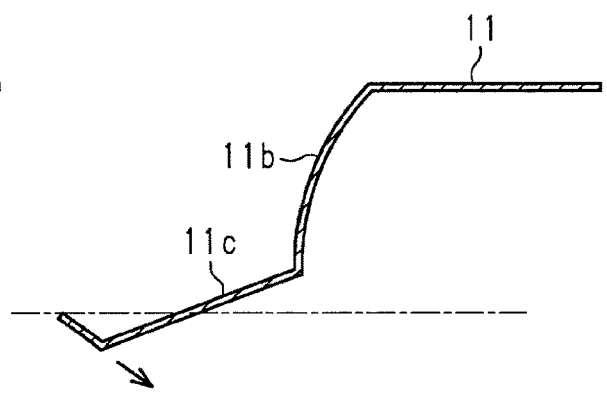
FIG. 5B is a schematic cross-sectional view showing the roof panel subsequent to the deformation without beads in the comparative example of FIG. 5A.

A rear opening structure of a vehicle according to an embodiment of the present disclosure will now be described with reference to FIGS. 1A to 6B. FIGS. 5A and 5B show a comparative example. In the description of each figure, the "front" and "rear" refer to a front-to-rear direction of a vehicle, the "upper" and "lower" refer to a vertical direction of the vehicle, and the "left" and "right" refer to the left and right when the vehicle is viewed from the rear.

Figure 1A:
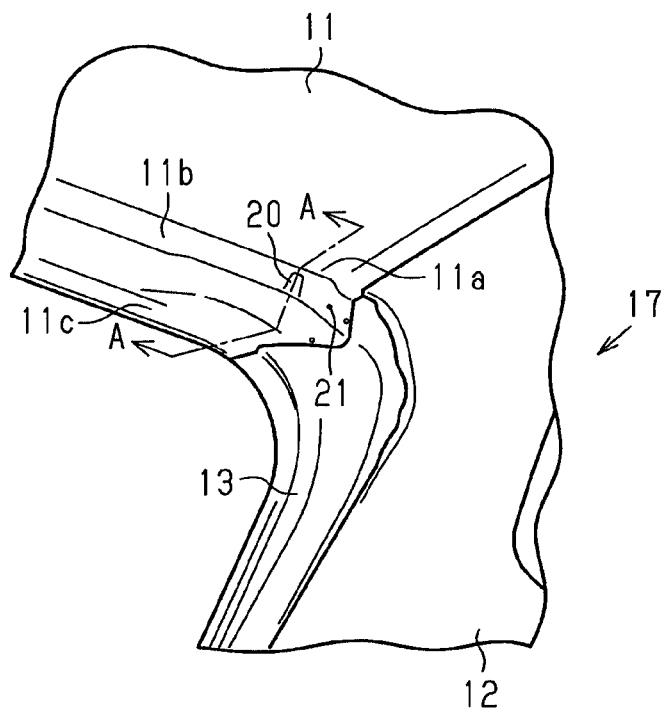
FIG. 1A is a schematic perspective view showing the upper part of one side in a rear opening structure of a vehicle according to an embodiment of the present disclosure, more specifically, showing the right upper part as the vehicle is viewed from the rear.

The rear opening structure for coupling a back door at the rear part of the vehicle is formed by laminated metal plates. More specifically, as shown in FIG. 1A, a roof panel 11, a side member panel 12, and a trough 13 are arranged on the outermost side of the rear opening structure of the vehicle so that the roof panel 11, the side member panel 12, and the trough 13 configure a design surface of the vehicle.

The roof panel 11 is located on the upper end of a rear opening 17 for coupling the back door. The roof panel 11 includes a rear end surface 11a, a horizontal wall 11c, and a vertical wall 11b. The rear end surface 11a defines the upper surface of the vehicle. The horizontal wall 11c extends in the width direction of the vehicle along the opening for coupling the back door and has a fixed width in the front-to-rear direction of the vehicle. The vertical wall 11b extends in the vertical direction of the vehicle to connect the rear end surface 11a and the horizontal wall 11c to each other. Further, the upper end of the trough 13 overlaps with the inner sides of the vertical wall 11b and the horizontal wall 11c of the roof panel 11.

Figure 1B:
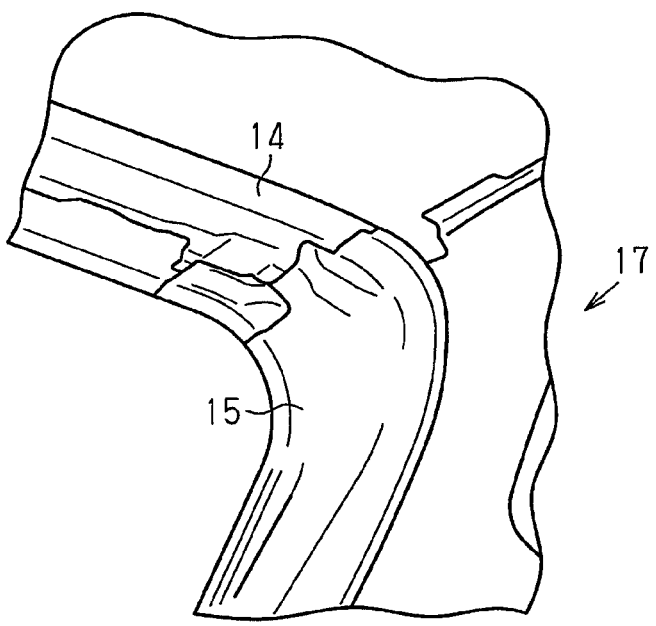
FIG. 1B is a schematic perspective view showing the upper part of the rear opening structure of the vehicle shown in FIG. 1A without a roof panel, a trough, or a side member panel.

As shown in FIG. 1B, a header 14 is arranged on a frame that defines part of the rear opening 17 for coupling the back door. The rear upper end of the roof panel 11 overlaps with the header 14. Additionally, the rear end of the side member panel 12 and a D-pillar outer part 15 define another part of the rear opening 17 for coupling the back door. The trough 13 overlaps with the header 14 and the D-pillar outer part 15. Further, the trough 13 overlaps with the header 14 and the D-pillar outer part 15, and the roof panel 11 covers the upper end of the trough 13. FIG. 1A shows a welding point 21 where the roof panel 11 and the trough 13 are welded to each other. FIG. 4 shows the cross section taken along line A-A in FIG. 1A. As shown in FIG. 4, the vehicle rear structure in the vicinity of the welding point 21 is formed by sequentially arranging the roof panel 11, the trough 13, and the D-pillar outer part 15 in this order so that they overlap with one another.

Figure 2A:
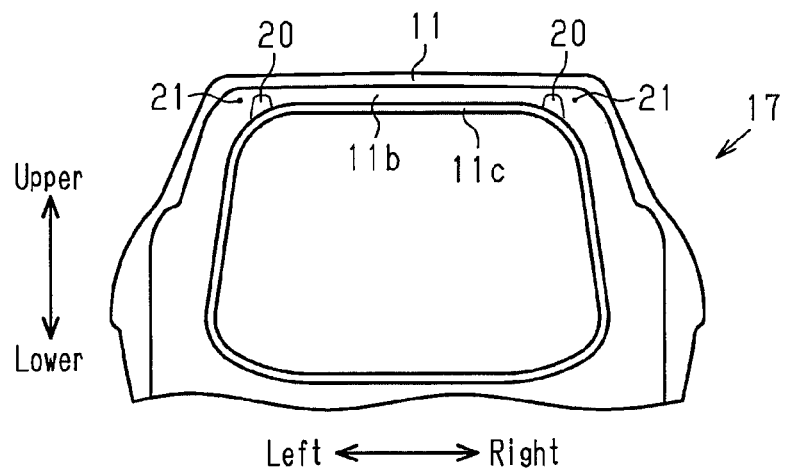
FIG. 2A is a schematic view showing the rear opening structure of the vehicle including the upper part shown in FIG. 1A.

As shown in FIG. 2A, the rear opening structure of the vehicle is symmetrical. In the rear opening 17 of the roof panel 11 of the vehicle, as shown in FIGS. 3A and 3B, the right upper corner includes a bead 20 formed on the right side of the vertical wall 11b. Further, the left upper corner of the vertical wall 11b includes a bead 20 in the same manner. That is, each bead 20 is located in the vicinity of the welding point 21 on the corresponding one of the left and right ends of the vertical wall 11b and on the inner side of the welding point 21 at the corresponding one of the left and right ends in the width direction. More specifically, the right bead 20 is located in the vicinity of the welding point 21 on the right end of the vertical wall 11b and on the left side of the welding point 21 on the right end of the vertical wall 11b. The left bead 20 is located in the vicinity of the welding point 21 at the left end of the vertical wall 11b and on the right side of the welding point 21 on the left end of the vertical wall 11b.

The lower end of each bead 20 is connected to a side of the horizontal wall 11c. More specifically, the lower end of the bead 20 is connected to a part of the vertical wall 11b adjacent to the horizontal wall 11c. The bead 20 is formed in a part of the vertical wall 11b of the roof panel 11 in which a gap exists. The lower end of the bead 20 has a larger width than the upper end of the bead 20. In other words, the part of the bead 20 closer to the rear end surface 11a has a larger width than the part of the bead 20 closer to the horizontal wall 11c in the vertical direction.

The operation of the rear opening structure of the vehicle will now be described with reference to FIGS. 2B, 5A, 5B, 6A, and 6B.

Figure 2B:
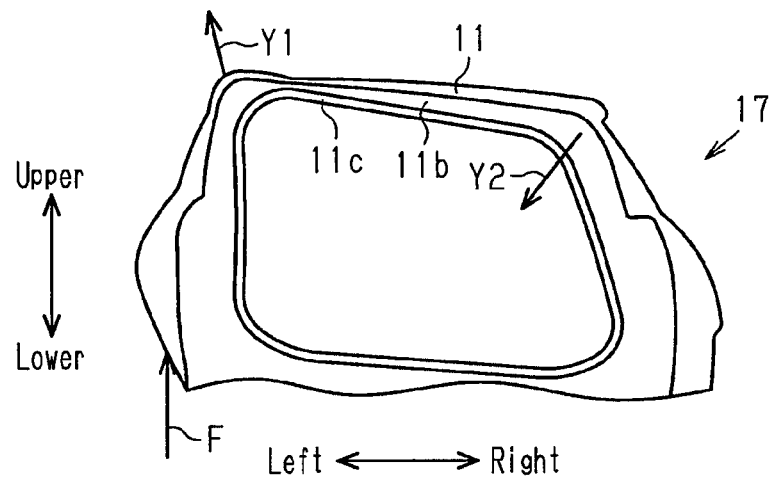
FIG. 2B is a schematic view showing the rear opening structure of the vehicle when an upward thrust acts in FIG. 2A.

As shown in FIG. 2B, while the vehicle is travelling, when a large upward thrust F is applied to the left side of the rear opening structure of the vehicle (the left side of the rear opening 17) from the left shock absorber, the left upper corner of the rear opening structure of the vehicle may be deformed toward the substantially diagonally upper side as shown by arrow Y1. This deformation may cause the right upper corner of the rear opening structure of the vehicle to be inwardly deformed toward the diagonally left side as shown by arrow Y2.

FIG. 5A shows a comparative example. In this case, for example, the vertical wall 11b of the roof panel 11 does not include a bead and has a flat shape in the vicinity of the welding point 21. Thus, when the above-described deformation of the right corner of the rear opening structure of the vehicle causes the roof panel 11 to receive force as shown in FIG. 5B, the entire vertical wall 11b deforms to be outwardly curved. When the entire vertical wall 11b deforms to be outwardly curved in this manner, large stress may be applied to the welding points 21, where the roof panel 11 and the trough 13 are welded to each other.

Figure 6A:
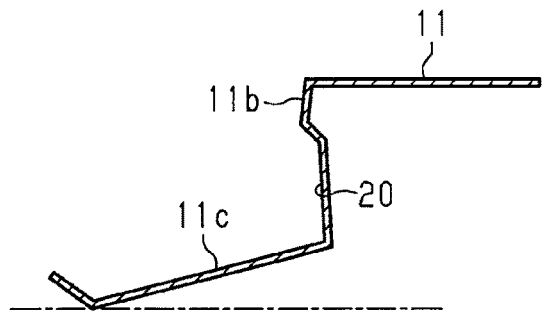
FIG. 6A is a schematic cross-sectional view taken along line C-C in FIG. 3A, showing the rear part of the roof panel prior to the deformation in the present embodiment with the beads.
Figure 6B:
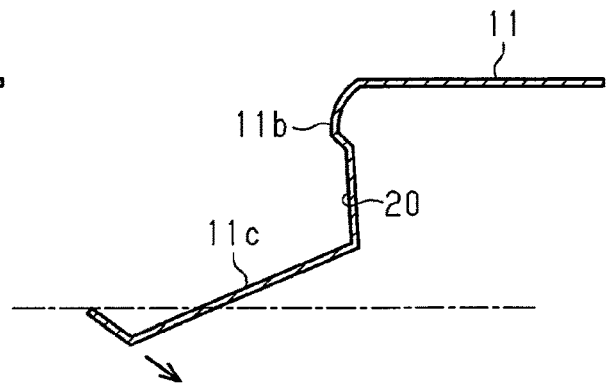
FIG. 6B is a schematic cross-sectional view taken along line C-C in FIG. 3A, showing the rear part of the roof panel of FIG. 6A subsequent to the deformation with the beads.

In the present embodiment, as shown in FIG. 6A, the bead 20 extending in the vertical direction is arranged on the inner side in the width direction in the vicinity of the right welding point 21 on the vertical wall 11b in the width direction. The bead 20 is continuous with the horizontal wall 11c. Thus, even if the above-described deformation of the right upper corner of the rear opening structure of the vehicle causes the roof panel 11 to receive force as shown in FIG. 6B, the bead 20 limits the outward curving of the entire vertical wall 11b.

In the same manner, in the present embodiment, while the vehicle is travelling, when the large upward thrust F acts on the right side of the rear opening structure of the vehicle (the right side of the rear opening 17) from the right shock absorber, the left upper corner of the rear opening structure of the vehicle may be inwardly deformed toward the diagonally right side. However, in the present embodiment, the bead 20 extending in the vertical direction is arranged on the inner side in the width direction in the vicinity of the left welding point 21 on the vertical wall 11b in the width direction. The left bead 20 is also continuous with the horizontal wall 11c. Thus, the outward curving of the entire vertical wall 11b is limited.

The above-described embodiment has the following advantages.

(1) The rear opening structure of the vehicle includes the roof panel 11 and the trough 13. The roof panel 11 includes the rear end surface 11a, the vertical wall 11b, and the horizontal wall 11c. Further, the beads 20 are respectively formed in the vicinity of the left and right welding points 21 on the vertical wall 11b in the width direction and on the inner side of the welding points 21 in the width direction. The beads 20 are connected to the horizontal wall 11c. Thus, even if the large upward thrust F acts on the rear part of the vehicle from the shock absorbers, the generation of high stress in the welding points 21 of the left and right upper corners of the rear opening 17 of the vehicle is prevented simply by changing the components, that is, by forming the beads 20 on the roof panel 11.

(2) The lower end of the bead 20 is connected to the side of the horizontal wall 11c. Thus, as compared to when, for example, the upper end of the bead 20 is connected to the side of the horizontal wall 11c, the outer appearance is preferred.

(3) The lower end of each bead 20 has a larger width than the upper end of the bead 20. This effectively prevents the generation of high stress in the welding point 21 of the upper corner of the rear opening structure of the vehicle.

It should be apparent to those skilled in the art that the present disclosure may be embodied in many other specific forms without departing from the spirit or scope of the disclosure. Particularly, it should be understood that the present disclosure may be embodied in the following forms.

Figure 7A:
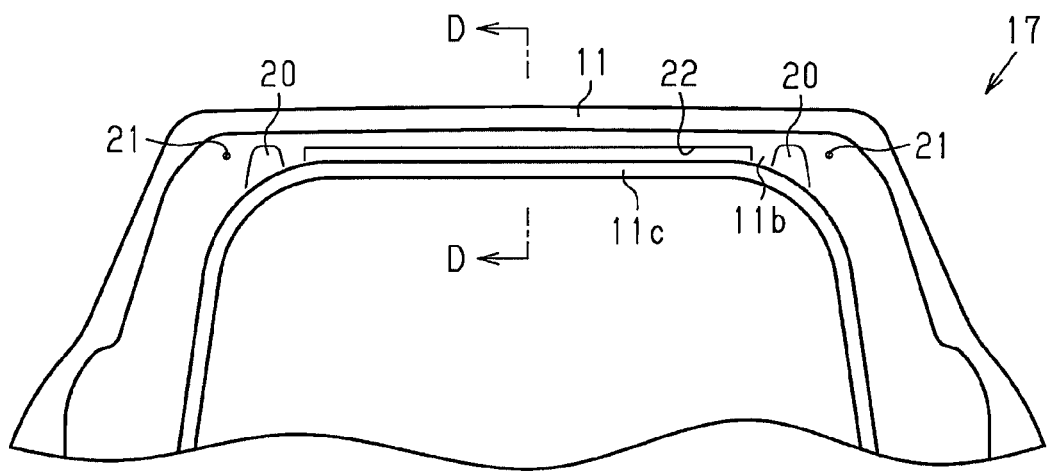
FIG. 7A is a schematic view showing the upper part of a rear opening structure of the vehicle in another embodiment.
Figure 7B:
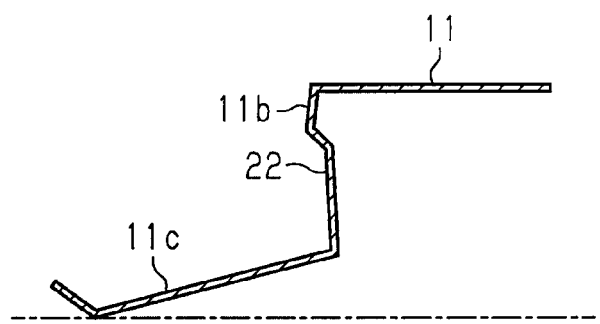
FIG. 7B is a schematic cross-sectional view taken along line D-D in FIG. 7A.

As shown in FIG. 7A, a step structure 22 extending in the width direction may be arranged between the left and right beads 20 of the vertical wall 11b in the width direction. As shown in FIG. 7B, the section of the step structure 22 on the side of the horizontal wall 11c bulges frontward. With this structure, as compared to when, for example, the beads 20 are arranged only on the left and right sides of the rear opening 17 in the width direction, the concentration of stress in the welding point 21 is further limited. Additionally, the step structure 22 may be integrated with the left and right beads 20.

Figure 8:
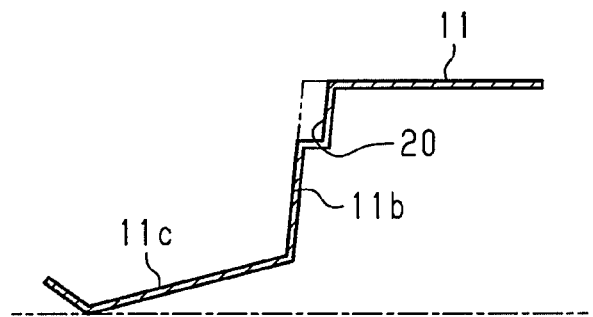
FIG. 8 is a schematic cross-sectional view that corresponds to FIG. 5A, showing a rear opening structure of the vehicle in a further embodiment.

As shown in FIG. 8, the bead 20 is formed such that the upper portion of the vertical wall 11b is located frontward from the part of the vertical wall 11b on the side of the horizontal wall 11c.

The part of the bead 20 closer to the horizontal wall 11c of the roof panel 11 may have a smaller width than the part of the bead 20 closer to the rear end surface 11a.

The beads 20 may each have a fixed width.

Figure 9:
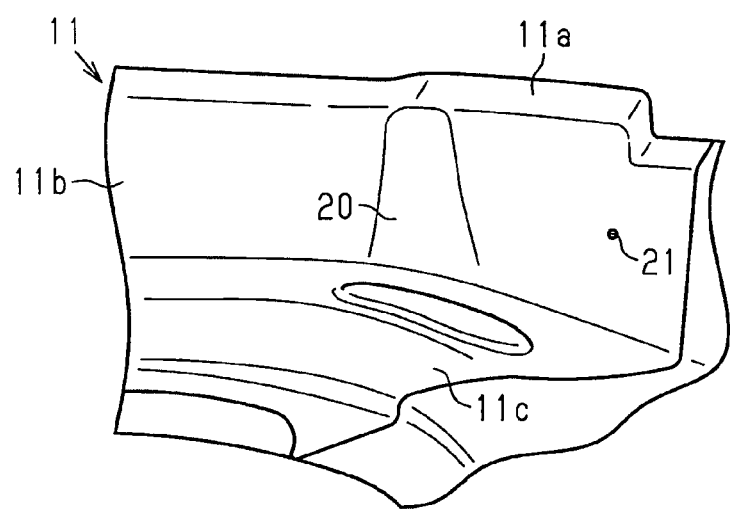
FIG. 9 is a schematic cross-sectional view showing a rear opening structure of the vehicle in still another embodiment.

As shown in FIG. 9, in the bead 20 extending in the vertical direction on the vertical wall 11b, the upper end of the bead 20 may be connected to the rear end surface 11a and the lower end of the bead 20 may be connected to the side of the horizontal wall 11c. In this case, when a large upward thrust acts on the rear part of the vehicle from the shock absorbers, the outward curving of the vertical wall 11b is further limited.

Therefore, the present examples and embodiments are to be considered as illustrative and not restrictive and the disclosure is not to be limited to the details given herein, but may be modified within the scope and equivalence of the appended claims.

The invention claimed is:

1. A rear opening structure of a vehicle, the rear opening structure comprising:
   a roof panel; and
   a trough, wherein
   a rear part of the vehicle includes an opening for coupling a back door,
   the roof panel and the trough are arranged on an upper end of the opening at the rear part of the vehicle,
   the roof panel includes:
   a rear end surface forming an upper surface of the vehicle,
   a horizontal wall extending in a width direction of the vehicle along the opening for coupling the back door, wherein the horizontal wall has a fixed width in a front-to-rear direction of the vehicle, and a vertical wall extending in a vertical direction of the vehicle to connect the rear end surface and the horizontal wall to each other, each of left and right ends of the vertical wall in the width direction includes a welding point where the roof panel and the trough are welded to each other, beads extending in the vertical direction are formed in a vicinity of each of the welding points of the left and right ends of the vertical wall and on an inner side of the welding points of the left and right ends in the width direction, each of the beads is formed such that an end of each bead in the vertical direction is connected to at least one of the rear end surface and the horizontal wall, each bead extends in the vertical direction on the vertical wall, each bead is arranged such that an upper end of the bead is connected to the rear end surface and a lower end of the bead is connected to a side of the horizontal wall, and the upper end of the bead is configured to reach an upper end of the vertical wall.

2. The rear opening structure according to claim 1, wherein each bead is arranged such that the lower end of the bead has a larger width than the upper end of the bead.

3. A rear opening structure of a vehicle, the rear opening structure comprising:

a roof panel; and a trough, wherein a rear part of the vehicle includes an opening for coupling a back door, the roof panel and the trough are arranged on an upper end of the opening at the rear part of the vehicle, the roof panel includes:

a rear end surface forming an upper surface of the vehicle, a horizontal wall extending in a width direction of the vehicle along the opening for coupling the back door, wherein the horizontal wall has a fixed width in a front-to-rear direction of the vehicle, and a vertical wall extending in a vertical direction of the vehicle to connect the rear end surface and the horizontal wall to each other, each of left and right ends of the vertical wall in the width direction includes a welding point where the roof panel and the trough are welded to each other, beads extending in the vertical direction are formed in a vicinity of each of the welding points of the left and right ends of the vertical wall and on an inner side of the welding points of the left and right ends in the width direction, each of the beads is formed such that an end of each bead in the vertical direction is connected to at least one of the rear end surface and the horizontal wall, and the vertical wall includes a step structure extending in the width direction between the bead arranged in the vicinity of the welding point at the left end and the bead arranged in the vicinity of the welding point at the right end.

4. A roof panel of a vehicle, wherein a rear part of the vehicle includes an opening for coupling a back door, the roof panel and a trough are arranged on an upper end of the opening at the rear part of the vehicle, and the roof panel comprises:

a rear end surface forming an upper surface of the vehicle;

a horizontal wall extending in a width direction of the vehicle along the opening for coupling the back door, wherein the horizontal wall has a fixed width in a front-to-rear direction of the vehicle; and a vertical wall extending in a vertical direction of the vehicle to connect the rear end surface and the horizontal wall to each other, wherein each of left and right ends of the vertical wall in the width direction includes a welding point where the roof panel and the trough are welded to each other, beads extending in the vertical direction are formed in a vicinity of each of the welding points of the left and right ends of the vertical wall and on an inner side of the welding points of the left and right ends in the width direction, each of the beads is formed such that an end of each bead in the vertical direction is connected to at least one of the rear end surface and the horizontal wall, and the vertical wall includes a step structure extending in the width direction between the bead arranged in the vicinity of the welding point at the left end and the bead arranged in the vicinity of the welding point at the right end.

5. A method for manufacturing a rear opening structure of a vehicle, the method comprising:

forming an opening for coupling a back door at a rear part of a vehicle;

preparing a roof panel that includes a rear end surface, a horizontal wall, and a vertical wall;

arranging the roof panel and a trough on an upper end of the opening at the rear part of the vehicle; and welding the roof panel and the trough to each other, wherein the arranging the roof panel and the trough includes:

forming, with the rear end surface, an upper surface of the vehicle, extending the horizontal wall in a width direction of the vehicle along the opening for coupling the back door such that the horizontal wall has a fixed width in a front-to-rear direction of the vehicle, and extending the vertical wall in a vertical direction of the vehicle to connect the rear end surface and the horizontal wall to each other, the welding the roof panel and the trough to each other includes welding the roof panel and the trough to each other at a welding point arranged on each of left and right ends of the vertical wall in the width direction, the preparing the roof panel includes forming beads that extend in the vertical direction in a vicinity of one of the welding points of the left and right ends of the vertical wall and on an inner side of the one of the welding points in the width direction, the forming the beads includes connecting an end of each of the beads in the vertical direction to at least one of the rear end surface and the horizontal wall, and the preparing the roof panel further includes forming a step structure on the vertical wall, the step structure extending in the width direction between the bead arranged in the vicinity of the welding point at the left end and the bead arranged in the vicinity of the welding point at the right end.

* * * * *